July 11, 1950 H. L. SMITH, JR 2,515,098
CONTINUOUS LOW TEMPERATURE DEHYDRATION
Filed Aug. 1, 1945 12 Sheets-Sheet 2

Inventor
Horace L. Smith Jr.
By Thiess, Olsen &
Mecklenburger Attys.

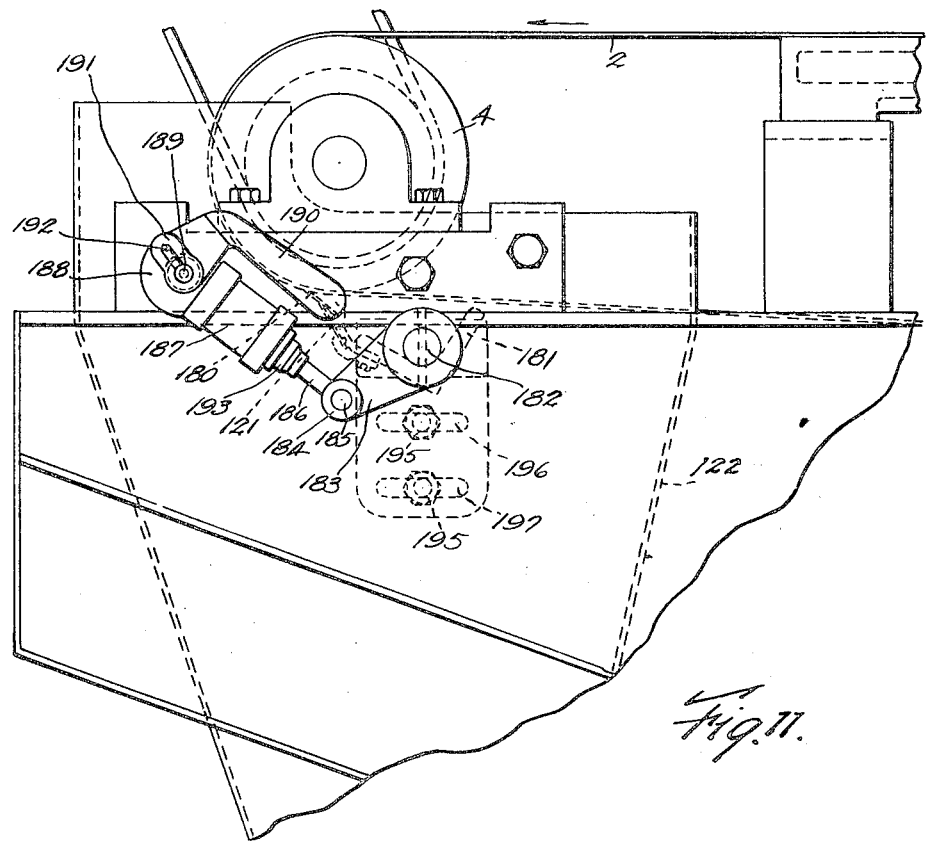
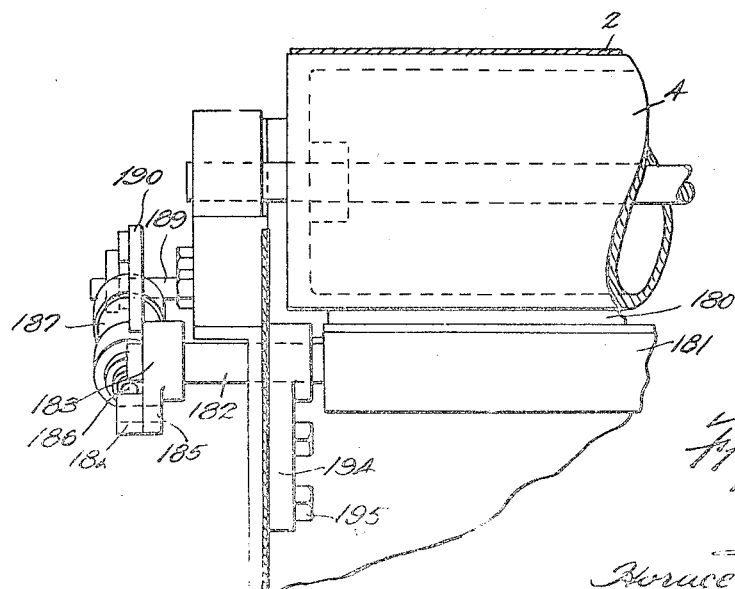

July 11, 1950 H. L. SMITH, JR 2,515,098
CONTINUOUS LOW TEMPERATURE DEHYDRATION
Filed Aug. 1, 1945 12 Sheets-Sheet 11
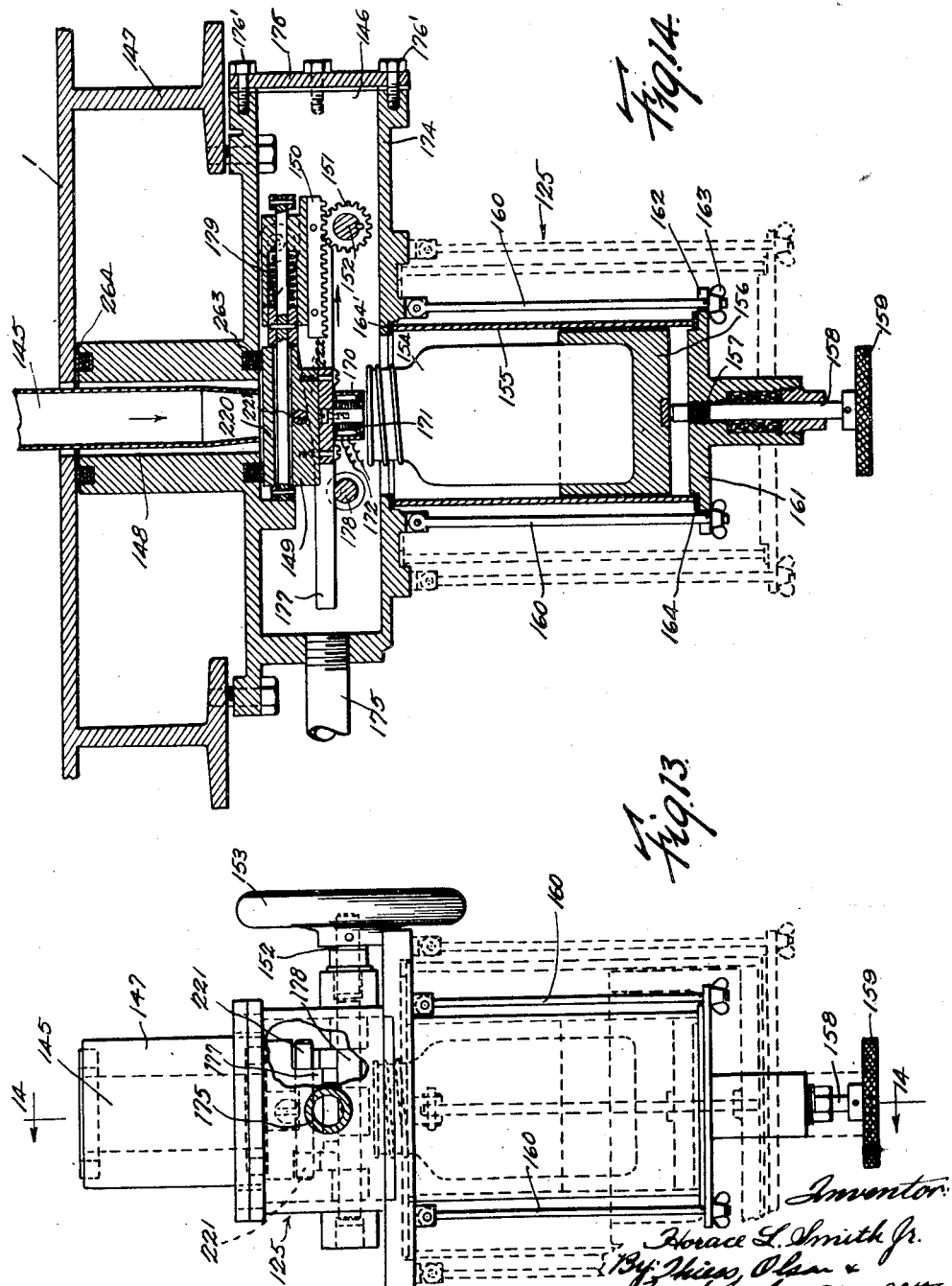

Patented July 11, 1950

2,515,098

UNITED STATES PATENT OFFICE 2,515,098

CONTINUOUS LOW-TEMPERATURE DEHYDRATION

Horace L. Smith, Jr., Richmond, Va., assignor to Chain Belt Company, Milwaukee, Wis., a corporation of Wisconsin Application August 1, 1945, Serial No. 608,106

12 Claims. (Cl. 34—5)

The present invention relates to the low-temperature continuous dehydration of liquid-containing materials, such as comestibles, inorganic hydrous oxides, sera, and similar materials.

The dehydration of solid and liquid substances containing water, under such conditions that a dry product results which is capable of quick and substantially complete solubility in water to produce a material having most, if not all, of the desirable properties of the original materials, has challenged the ingenuity of experimenters and inventors for many years. While, generally speaking, the dehydration, or drying, of materials containing liquids associated therewith, has been practiced, in a more or less empirical manner for many centuries, it was not until quite recently that proper attention has been paid to the resulting dried or dehydrated product. Formerly, operators of drying equipment were contented with the production of a material that would have merely good keeping qualities, and which, hence, could be preserved for considerable periods of time. When it came, however, to the production of dried products which in their original condition contained relatively large amounts of water, or other liquid, the resulting dried products often left much to be desired. While they might be possessed of good general keeping qualities, yet they would differ radically in taste from the original material, and would, in many instances, also be difficultly soluble, so that the so-called "reconstitution" of the material by dissolving it in an appropriate amount of liquid, such as water, would be difficult or even impossible. This was particularly true of comestibles, such as milk, eggs, fruit juices, dried coffee extracts, and similar food products, and in the case of sera or other biologically active material, such as blood plasma, etc.

About forty years ago a slow and cumbersome process of avoiding these difficulties was proposed, comprising the freezing of the material that it was intended to dry, and the direct sublimation of the ice therein under a vacuum high enough to permit the ice to sublime without conversion thereof into the liquid condition. It was also proposed to effect the freezing of the material by subjecting it to such low pressure conditions as to effect vaporization of some of the water therein, whereby, as the result of the energy consumed in the vaporization of the water, the temperature of the product would be reduced to the freezing point of its constituent water, whereafter, by supplying the necessary heat energy, the resulting ice would be sublimed, and a dry product result.

In more recent years, much activity has occurred in the large scale drying of blood plasma and other physiological material by this freezing-drying process. In some instances refrigeration at low temperatures was employed first to quick-freeze the material, whereafter the ice therein was sublimed under a very high vacuum while supplying gentle heat to the frozen material. In each and every instance, however, the process was strictly a batch operation; and in most instances was applied to generally very small individual quantities of the material, as in the drying of blood plasma in relatively small glass flasks, which then also served as the package for the dried material.

On the other hand, so-called "vacuum drying" has also found much favor during the past fifty or sixty years. Mainly by reason of the impossibility of commercially producing the required very high vacuum, such vacuum drying has been accomplished at temperatures well above the freezing point of water, say at about 50 to 70° C. To vaporize water at these temperatures, however, did not require particularly high degrees of vacuum, and ordinary commercially available vacuum pumps, coupled with suitable condensers, sufficed to condense the water vapor formed.

When, however, employing very high vacuum conditions, the pumping of the highly attenuated water vapor made commercial application of high-vacuum drying operations on a large scale unfeasible.

In accordance with the present invention, however, for the first time has very rapid and large scale dehydration under very high vacuum conditions been made possible, so that commercial dehydration of commodities such as milk, coffee extracts, fruit juices, egg albumen, animal blood, etc., at temperatures below the freezing point of water might be rapidly and economically effected. When operating under the teachings of the presently to be described invention, as when drying from the frozen state, a vacuum on the order of not exceeding about 4000 microns absolute pressure (4 mm. Hg column) is employed. Under such low pressure conditions, aqueous materials introduced into the evacuated space so rapidly lose water by vaporization that they are almost instantaneously frozen, so that by the application of sufficient heat energy the rest of the water therein can be rapidly vaporized without melting the ice in the frozen material. As a consequence of this, the dried products obtained are of such a nature that they are fully and quickly soluble in water, and when mixed with an amount of water corresponding to that which they originally contained, will reproduce a liquid product which is practically indistinguishable from the original undried material. This is particularly true of whole milk, cream, coffee extracts and some of the fruit juices. It is also true of blood plasma, sera, and biologically active materials.

In accordance with the present invention it becomes possible for the first time to dehydrate such materials at great productive capacity, and at a cost which compares favorably with even the simple vacuum drying hitherto employed.

Accordingly, it is one of the objects of the present invention to provide a process and apparatus for the continuous large scale low-temperature dehydration or drying of a large group of materials, such as food products, sera, plasma, biologically active materials, extracts, and even certain inorganic materials which, unless carefully dried from an aqueous condition, would tend to form irreversible colloids which could not be reconstituted by contact with water or other solvent.

As an aid to the full understanding of the process and apparatus, it is described in connection with twelve sheets of drawings, in which Fig. 1 is a diagrammatic representation, in the nature of a partially illustrative flow sheet, disclosing the entire assembled apparatus and the process carried on therein, and furnishes a key to the assembly of the instrumentalities described in the other drawings;

Figure 2:
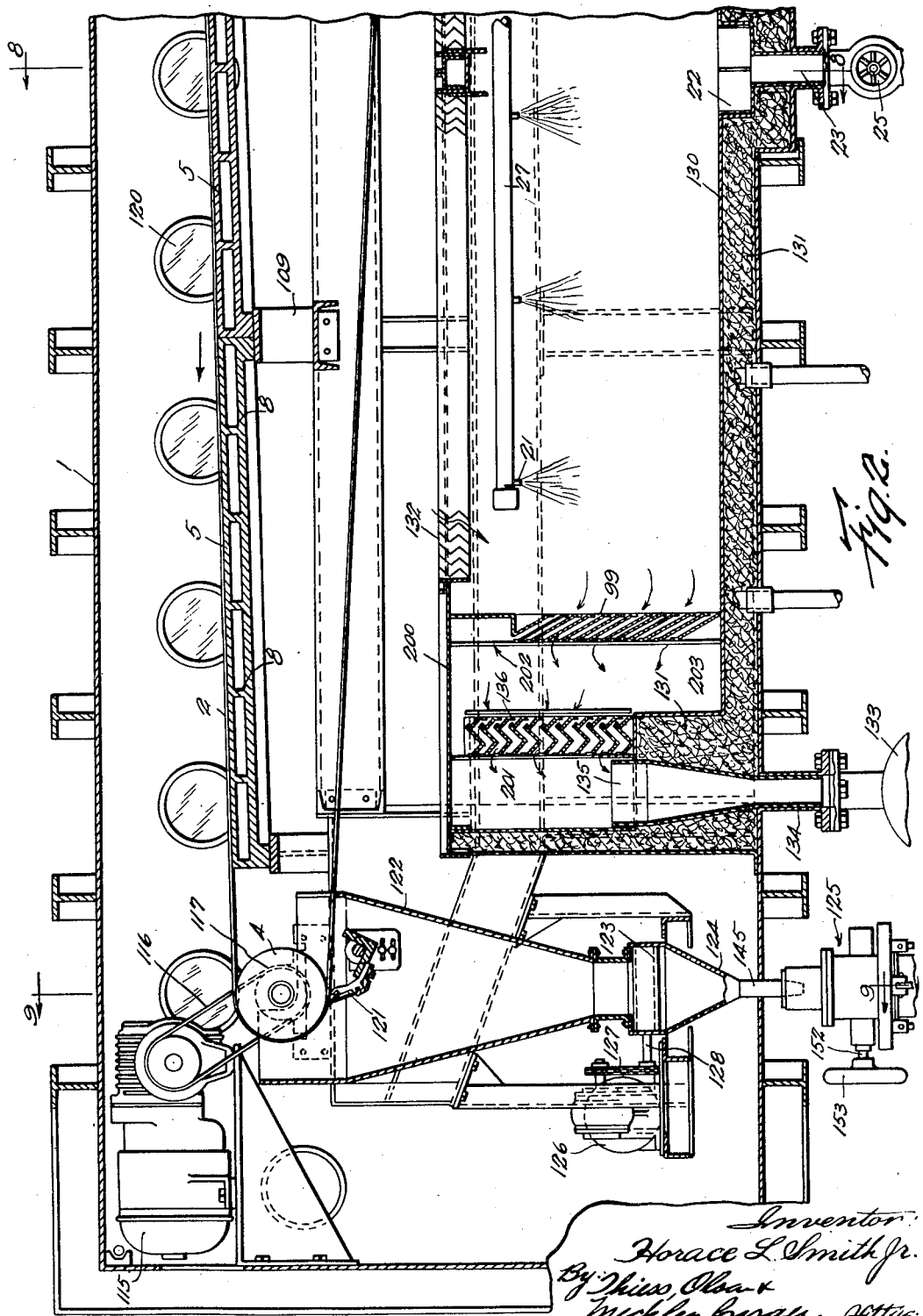
Fig. 2 is a longitudinal vertical section of the discharge-end of the apparatus.
Figure 3:
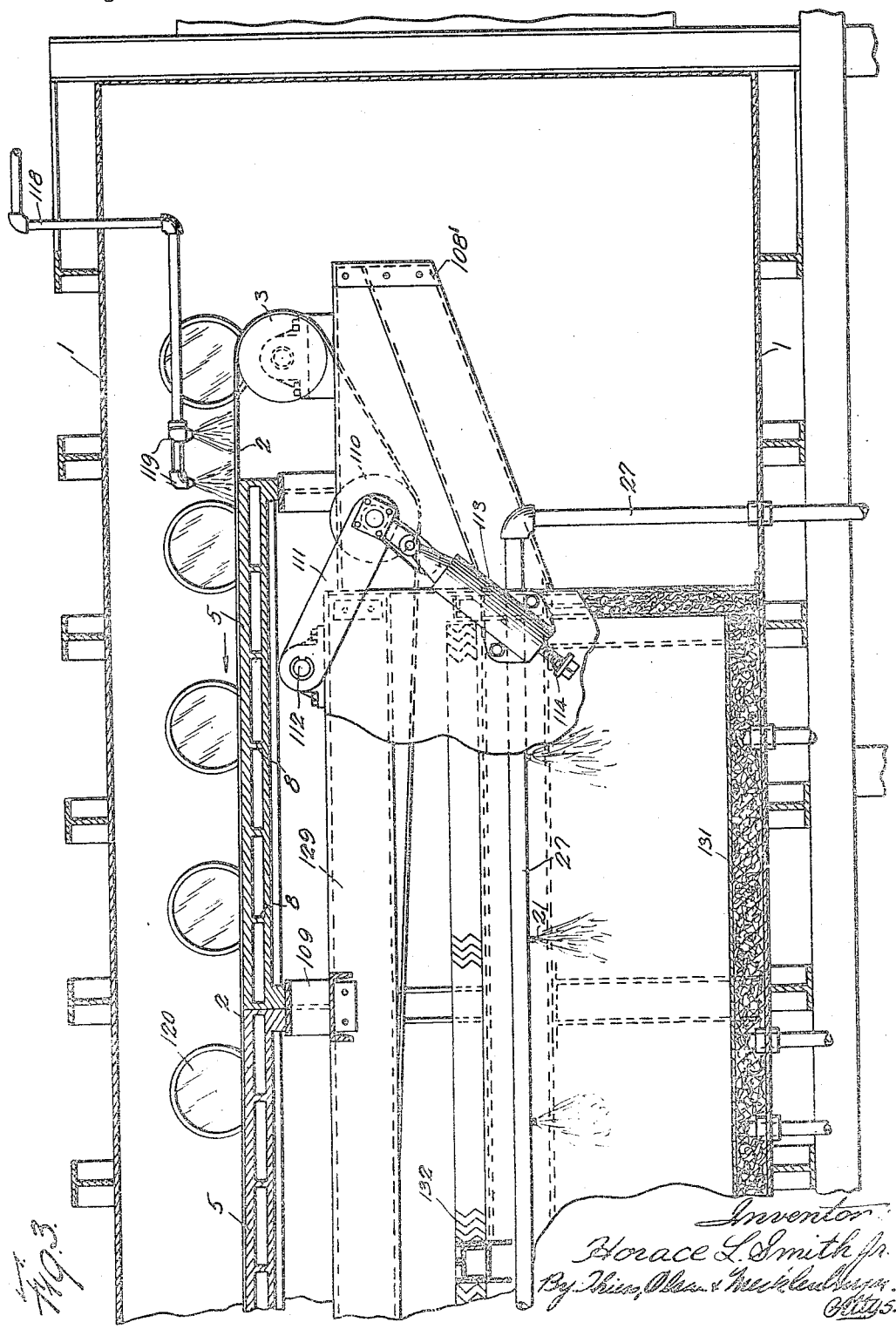
Fig. 3 is a similar section of the feed-end of the apparatus, the two figures together constituting a longitudinal vertical section of the entire portion of the apparatus in which the drying is accomplished.
Figure 4:
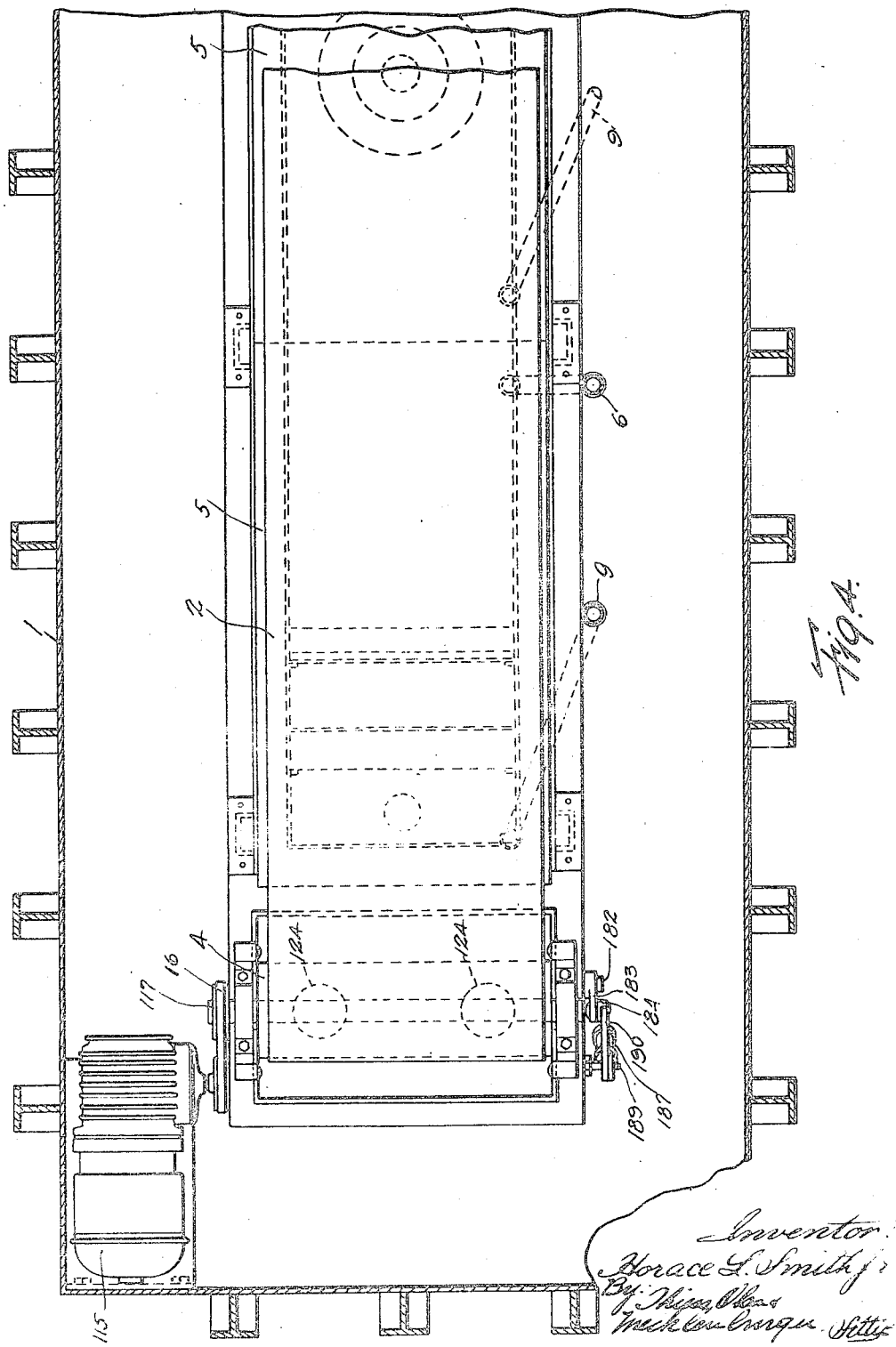
Figure 5:
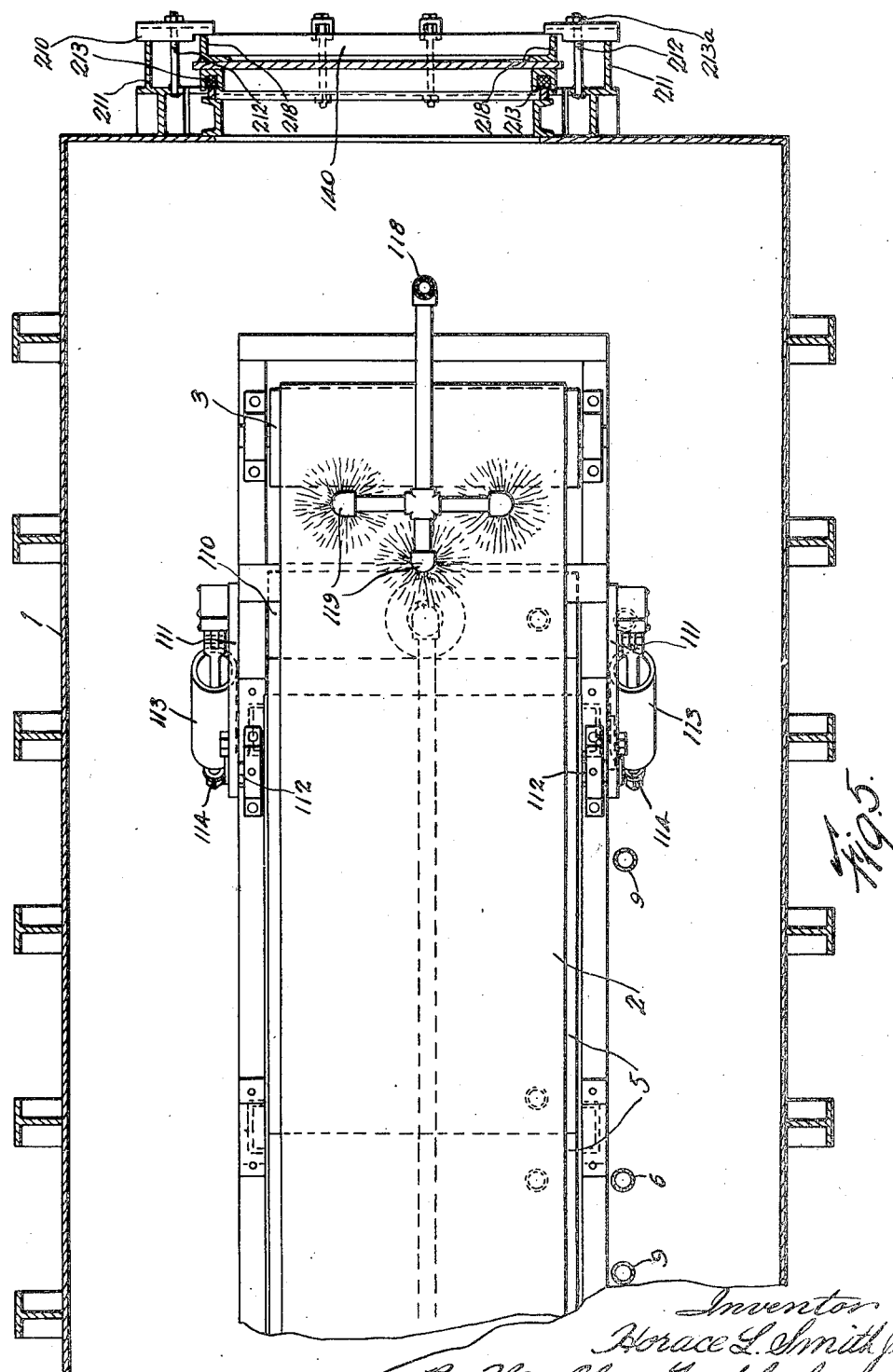
Figure 6:
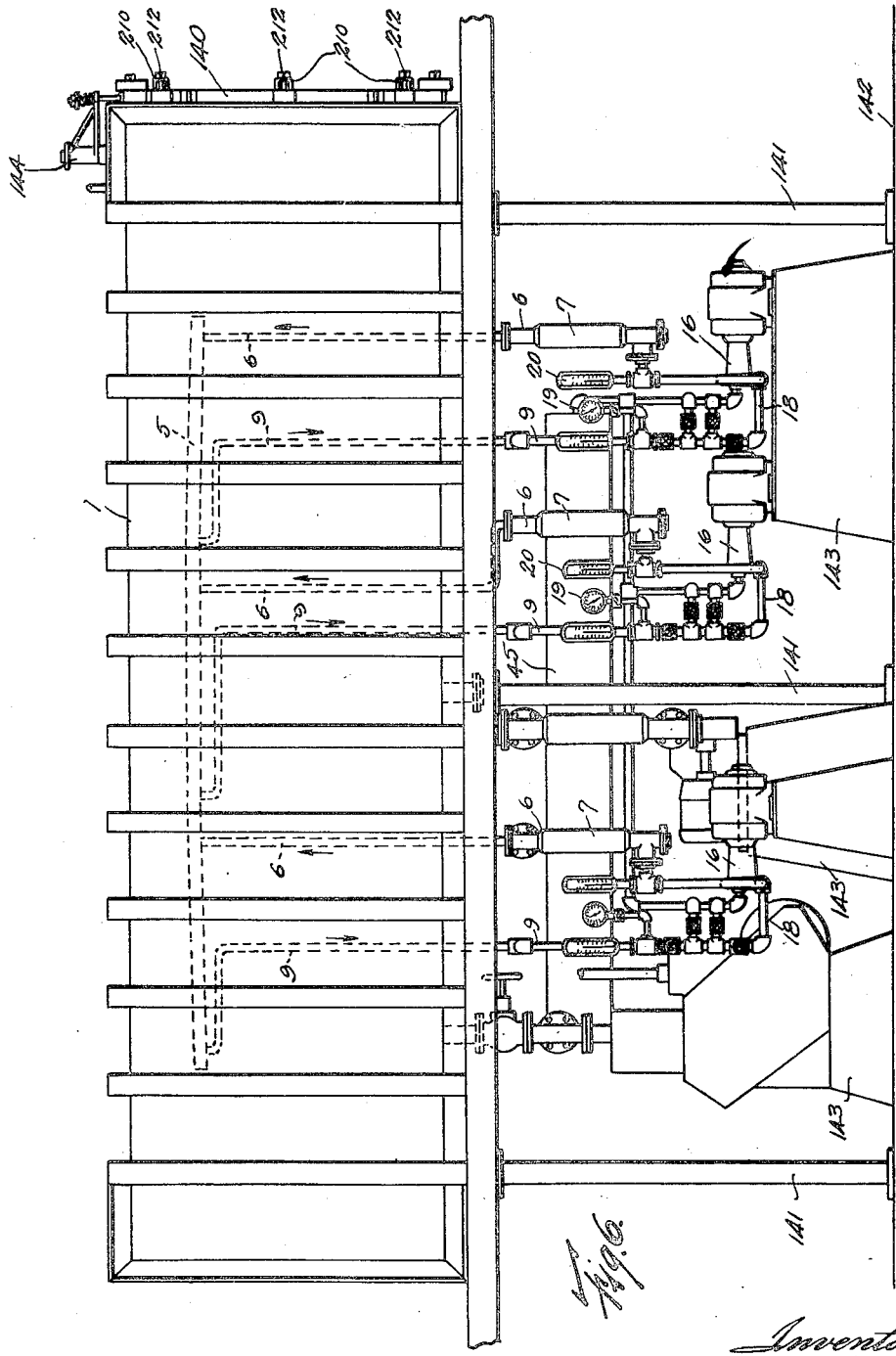
Figure 7:
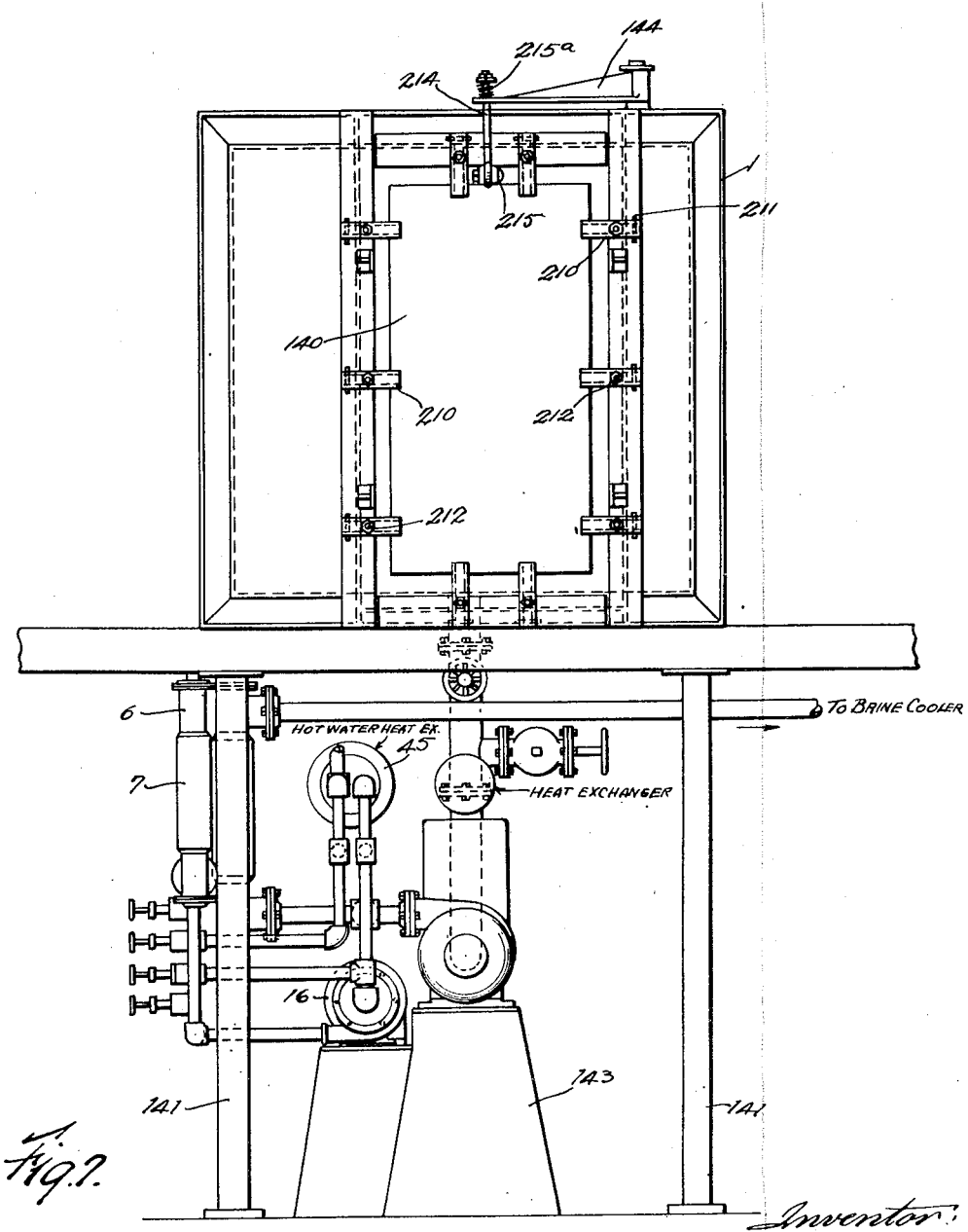
Figure 8:
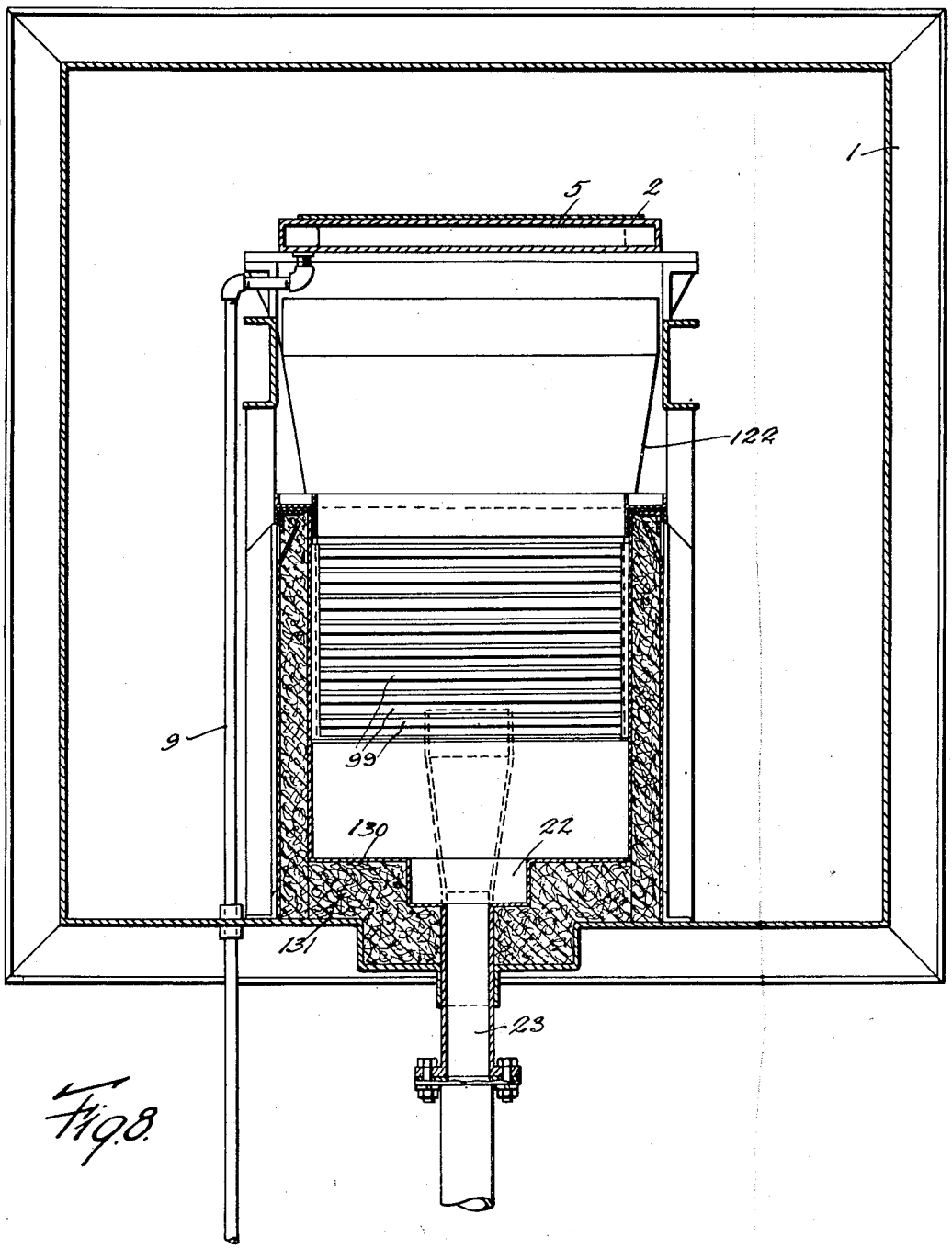
Figure 9:
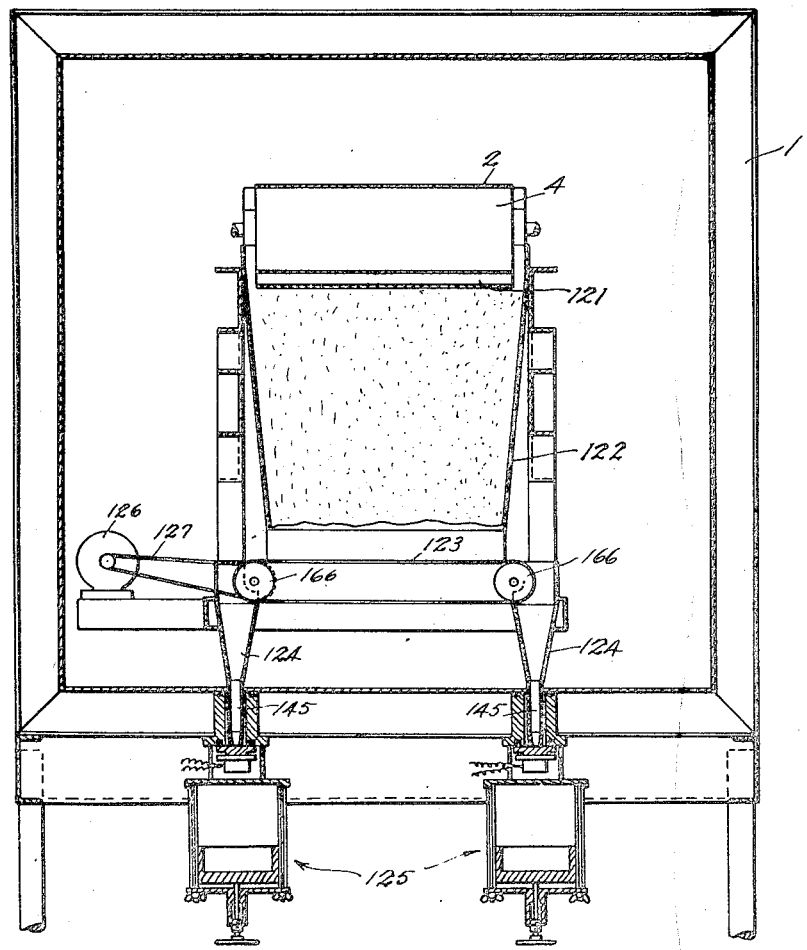
Figure 10:
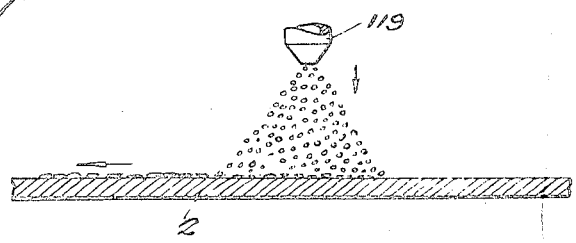
Figure 15:
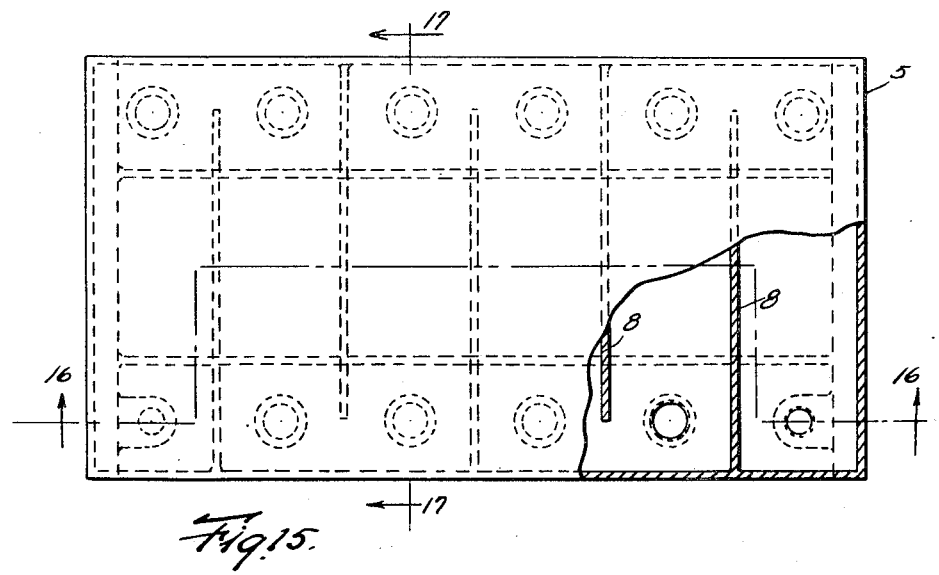
Figure 16:
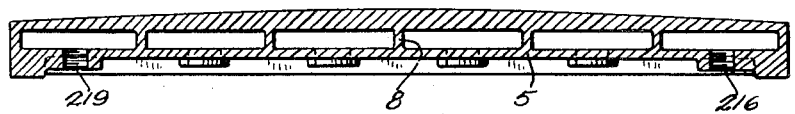
Figure 17:
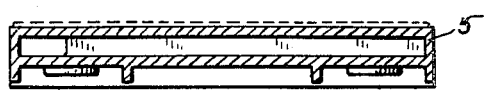

Figs. 4 and 5 respectively are top plan views, partially in section, corresponding to the apparatus shown in Figs. 2 and 3;

Fig. 6 is an elevation of one side of the apparatus;

Fig. 7 is an elevational view of one end of the apparatus showing the means for access thereto;

Fig. 8 is a vertical section along the lines 8—8 of Fig. 2;

Fig. 9, on a somewhat reduced scale, is a section along the line 9—9 of Fig. 2;

Fig. 10 is a side view of that portion of the apparatus shown in Fig. 3 by means of which the material to be dried is placed upon the drying belt, the illustration being partly diagrammatical;

Fig. 11 is a side elevational view, on an enlarged scale, of the means employed to remove dried material from the drying belt;

Fig. 12 is an end view, partially in section, of the apparatus shown in Fig. 11;

Fig. 13 is a side elevation, on an enlarged scale, of the instrumentalities employed for removing dried material from the apparatus without destroying the vacuum conditions therein;

Fig. 14 is a section of the device shown in Fig. 13, along the central line 14—14;

Fig. 15 is a plan view, on an enlarged scale, of one of the heating platens, the lower right hand end being shown partially in section;

Fig. 16 is a vertical section along the line 16—16 of Fig. 15;

Fig. 17 is a cross section along the line 17—17 of Fig. 15; and

Figure 18:
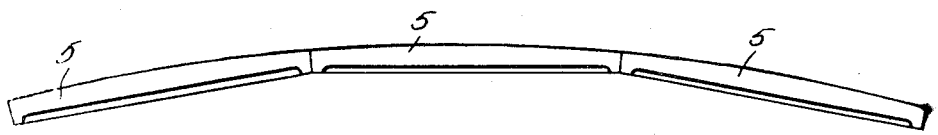

Fig. 18 is a side elevation, on a reduced scale, of an assembly of platens used to heat the drying belt.

The process employed for carrying out the low temperature dehydration comprises in essence the application of a thin layer of a flowable material containing the liquid which is to be removed, for example water, to a moving heat-conducting conveying means, which latter are maintained in an evacuated space maintained at a gas pressure of not over about 4000 microns, that is to say, 4 millimeters absolute pressure (mercury column), thus substantially instantly freezing the applied material upon and in contact with said conveying means as a result of the loss of heat occasioned by the rapid vaporization therefrom of some of its constituent water. Thereafter, and while said conveying means are still in continuous motion, the material frozen thereon is dried by effecting adequate heat transfer to the conveying means, as for example by moving it in contact with a suitably heated platen or similar heat supplying means. In order to eliminate the resultant water vapor, which at the state of attenuation in so high a vacuum would have an enormous volume, no attempt is made to remove this water vapor from the evacuated space, but on the contrary the water vapor is immediately condensed within the space by means of a refrigerated liquid which at the temperature at which it is used has a vapor tension so low as not to yield any vapor of its own to the evacuated space. This liquid may be either one in which the vapor is soluble, such for example as suitable brine, for instance lithium chloride or the like, or may be some other sufficiently cold liquid which is capable of condensing the water directly to ice, forming therewith a slush which is still capable of being pumped out of the apparatus into normal atmospheric pressure surroundings, whereupon the water may be either evaporated from the brine, or in case of the use of a non-miscible liquid, separated therefrom by gravity. It is another feature of the process to refrigerate the cooling agent, and then to reintroduce it into the apparatus, all as more fully disclosed and claimed herein below. Moreover, when evaporation is employed to restore the appropriate sorbent, such as a brine, to its original concentrated condition, heat is required to vaporize water therefrom with the resultant formation of steam, which steam is then employed to heat the heating medium which serves to supply heat units to the frozen material which is being dehydrated.

Figure 1:
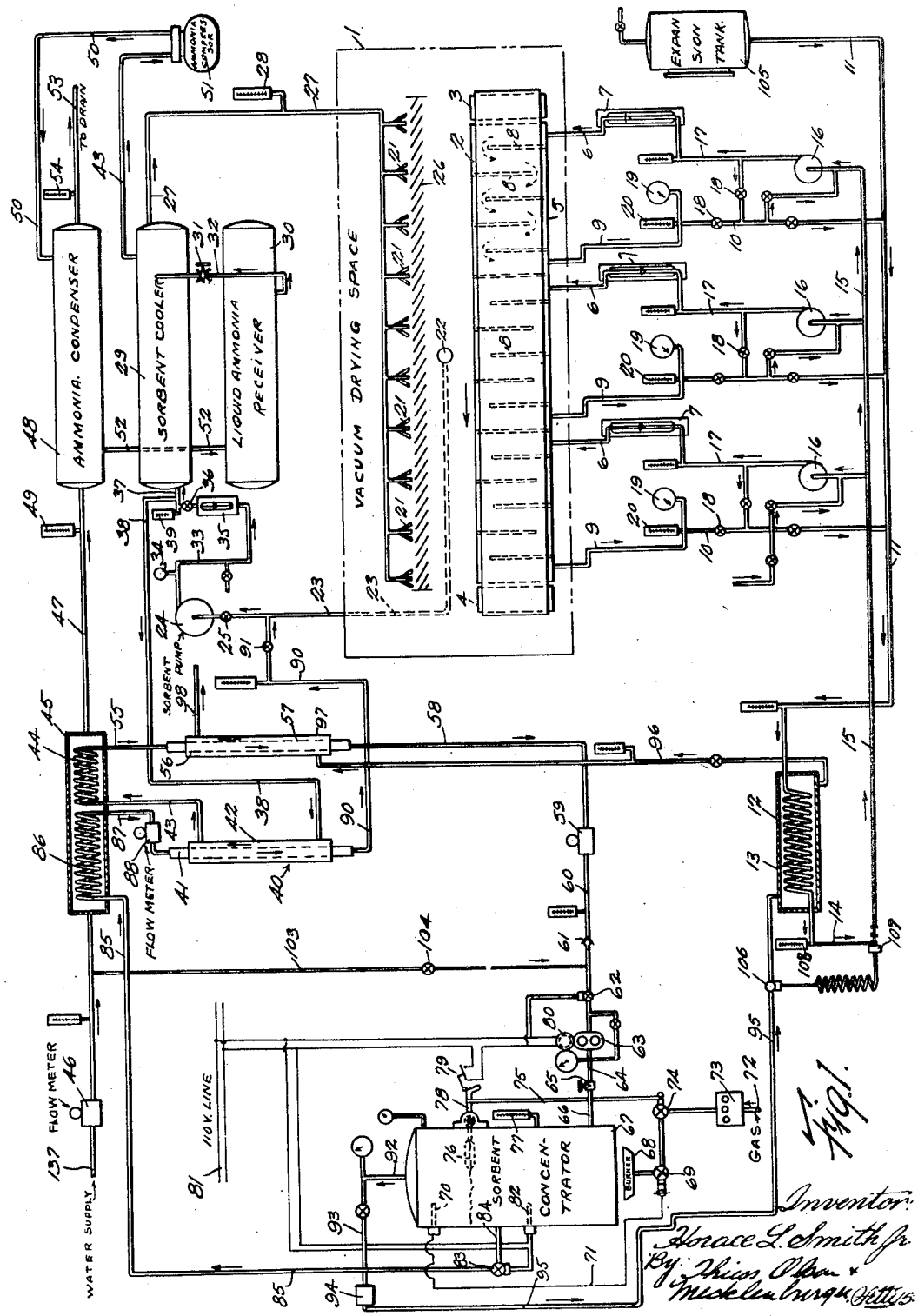

Referring more particularly to Fig. 1, which is a flow sheet of the process, there is maintained within the evacuated space 1, designated by dash and dot lines in the central right hand portion of the figure, a vacuum of not exceeding 4000 microns (4 millimeters Hg column).

While most of the elements shown in Fig. 1 are illustrated diagrammatically by side elevations, certain of the elements in the evacuated or vacuum drying space 1 are shown, on the contrary, as a top plan view, in order that their functions may be more readily understood.

It is of course also to be understood that the actual location of the various parts is not necessarily that shown in Fig. 1, and the relationship of the parts will be more fully described in connection with the other more detailed illustrations.

Referring primarily to Fig. 1, the evacuated or vacuum drying space 1 contains a moving heat-conducting conveying means 2 which is supported, and given a translational movement in the general direction of the arrow, (that is, to the left), by means of rollers 3 and 4, located at opposite ends of an arched supporting or bridge-heating-platen 5, upon which the conveying means 2 slides. This conveying means 2 is preferably made of a suitable metal which will not corrode or rust such as stainless steel, aluminum, or the like, and therefore will not contaminate the material which is being dried. The supporting and heating means 5 are preferably a plurality of separate adjacent platens. A suitable heating medium, for example, warm water, is caused to circulate through each of the heating means 5, being introduced, for example, by means of pipes 6, the flow of water or other heating medium through each platen being indicated by means of suitable flow meters 7. The heating medium is caused to traverse the heating means 5 in a circuitous path as a result of internally thereof located baffles 8, so that the heating medium will take approximately the course indicated by the broken arrows. The heating medium is withdrawn through the pipes 9, and eventually finds its way through pipes 10 into a collecting pipe 11 which leads to the heat exchanger 12, whose coil 13 it traverses, eventually issuing therefrom through pipes 14 and 15, whence it is conducted by pumps 16 to pipes 17 leading to the aforementioned flow meters 7 and hence through pipes 6 to the heating means 5. Suitable valves 18 are provided at the various parts of the apparatus so that the flow may be controlled, as under some circumstances it is desirable to take some of the liquid heating medium back from pipes 10 into pipes 17. Suitable pressure gauges 19 and thermometers 20 are provided so that the pressure and temperature conditions existing in the platens 5 may be known to and under the control of the operator. These various devices will be described in greater detail in connection with the individual figures of the actual apparatus illustrated.

There are also present, although not illustrated on the flow sheet, means which deposit the material to be dried upon the conveying means 2, and there are also further means such as a doctor blade (shown in detail in the other views), which scrapes the dried material from the other end of the conveying means 2, and causes it to be deposited upon transversely thereof operating means 123 which serve to conduct the dry material to collecting and packing means (not illustrated in Fig. 1, but which will be described in detail hereinbelow). The actual vacuum pump which is employed to create and maintain a vacuum in the space 1 is not illustrated in Fig. 1, as it consists of a well-known type of instrumentality whose exact point of connection is described in detail further on.

In order to condense the vapor produced as a result of the vaporization of the moisture in the material which is dried on the conveying means 2, there are also provided a plurality of spray nozzles 21 which are purely diagrammatically illustrated in Fig. 1, and which in actual practice are located directly beneath the conveyor 2. On the floor of the evacuated or vacuum drying space 1 there is a collecting tank so positioned that the cold absorbent sprayed into the chamber will tend to collect therein and flow to the sump 22 from whence it is conducted out of the apparatus from the pipe 23 by means of the sorbent pump 24, there being a suitable valve 25 for the control of said flow. A suitable set of louvres 26, through which the evolved water vapor passes, is also provided. The temperature at which the condensing agent, sorbent or brine is sprayed into the apparatus through the spray nozzles 21, which are fed by means of the pipe 27, is so low that even under the conditions of low pressure existing in the evacuated space 1 there is substantially no vapor liberated therefrom. In fact, any solvent vapor or water vapor which is being removed from the material that is undergoing the drying will either be at once condensed into ice in case the sorbent is a non-water miscible material or will be dissolved therein in case it is a brine such as a solution of lithium chloride. The exact strength of such brine and its further method of handling will be described further hereinbelow in connection with the description of the actual apparatus.

A thermometer 28 indicates the temperature of the sorbent which is flowing through pipe 27. The sorbent is refrigerated in the direct expansion sorbent-cooler 29 in which the sorbent is cooled by direct expansion of liquid ammonia which is contained in high pressure liquid-ammonia container 30, being expanded into the cooler through the expansion-valve 31 located in pipe 32, which leads from the receiver 30 to the sorbent-cooler 29. In ordinary operations the dilution of the sorbent which is sprayed into the evacuated space 1 from the nozzles 21 is rather gradual, and during the early part of the run of the apparatus it may not be necessary to fortify or strengthen the sorbent, such for example as lithium chloride brine, until it has been so diluted by condensed water vapor as to tend to give off vapor itself, whereafter its concentration is necessary.

Taking up the flow of the sorbent or brine flowing out of the evacuated space 1 through the sump 22 and line 23, this, under the control of valve 25 and pump 24, is pumped through line 33, which is provided with gauge 34, through the flow meter 35, and through valve 36 and pipe 37, into the sorbent-cooler 29 which it traverses through a suitable coil (not shown), issuing through the pipe 27 to be returned to the spray nozzles 21. There is, however, provided a branch pipe 38, and a thermometer 39, the former leading to a heat exchanger 40 which consists of a centrally located pipe 41 and a jacket 42. The sorbent liquid or brine, which although at this stage is not as cold as it was when sprayed into the space 1, is still quite cool, and therefore advantageously may be partially heated before being sent to the sorbent concentrator 67 (see hereinbelow). In order not to confuse the description of the flow, suffice it to say for the moment that a portion of the sorbent entering the jacket 42 of the heat exchanger 40 flows therethrough and leaves it through the pipe 43, and enters the heat-exchanging coil 44 of heat exchanger 45, thereby cooling the water flowing therethrough and which water is introduced through the water supply pipe 137 (see upper left-hand corner of Fig. 1). Under the control of flow meter 46, the water traverses the main body of the heat exchanger 45, and as a result of the cooled partially dilute sorbent or brine passing through coil 44 therein, it is cooled, the thus cooled water thence flowing through pipe 47 into the ammonia condenser 48. Thermometer 49 enables the ascertainment of the temperature of the water flowing through pipe 47 into ammonia condenser 48. In this ammonia condenser there is introduced, through pipe 50, compressed anhydrous ammonia coming from the ammonia compressor 51. This greatly compresses the gaseous anhydrous ammonia so that under the influence of the cold water traversing the ammonia condenser 48 the ammonia is condensed into the liquid state, and thence is transferred by pipe 52 into the liquid-ammonia receiver 30, where it is stored until expanded through valve 31 back into the sorbent-cooler 29, wherein the liquid ammonia vaporizes and is transformed into the vapor state, the resultant cooling effect serving to refrigerate the sorbent or brine which is traversing the sorbent-cooler 29 in indirect heat-exchange relationship with the vaporizing ammonia. The resulting dry ammonia vapor leaves the sorbent cooler 29 through pipe 43, which conducts it back to the ammonia compressor 51. This therefore completes the ammonia cycle which furnishes the refrigeration required for the operation of the process. The water finally leaves the ammonia condenser 48 through the line 53 which leads to the drain. A thermometer 54 is provided so that the temperature of this water may be ascertained.

Taking up the further flow of the sorbent which has become diluted as a result of the absorption of the water, for instance the lithium chloride brine, and which has been mentioned as traversing the coil 44 of heat exchanger 45 (see upper left portion of Fig. 1), the brine which has now absorbed some of the heat from the water flowing through the heat exchanger 45 leaves the coil 44 through pipe 55, and enters a second heat exchanger 56 flowing through the central pipe 57 thereof, and continues its flow through pipe 58, flow meter 59, pipe 60, and check valve 61, thence flowing through automatically controlled valve 62 to the gear pump 63, leaving this pump through pipe 64 and passing through variable flow control needle valve 65, and thence through pipe 66 into the sorbent concentrator 67, which consists of a suitable boiler or tank, in which the sorbent or brine may be heated by means of the burner 68 which is under the control of the modulating valve mechanism 69, which is connected by means of line 71 with a pressure-controller 70, located in the steam portion of the sorbent concentrator 67. The gas for this purpose is supplied through the gas main 72, flowing through the meter 73, and a further control valve 74, which latter is controlled through the rod 75 by means of a float 76 which floats upon the sorbent or brine in the sorbent concentrator 67. The reason for controlling the gas valve also at this point is to prevent heating of the boiler when the level is lower than that predetermined. There is thus a burner control both by the level of the material as well as by the temperature of the vapor space thereof. There is also a thermometer 77 which enables the temperature to be determined in the concentrator 67. Other safety valves and gauges are provided, as indicated.

The switch 79 actuated by lever 78 is so arranged that when the level of the sorbent in the concentrator falls, the switch will be closed so as to drive motor 80, deriving its energy from the main 81, said motor being associated with the gear pump 63, so as to pump dilute brine or sorbent into the concentrator 67.

As the brine is concentrated through evaporation of water in the boiler, its boiling point increases. A thermostat 82 located within the brine is set for a temperature corresponding to the boiling point of the desired concentration of the brine at the pressure prevailing. When the concentration of the brine reaches this amount, the thermostat 82 energizes the solenoid valve 83 causing it to open and permitting passage of concentrated brine from the line 84 to the line 85 leading to the heat exchanger coil 86 within the already mentioned heat exchanger 45, which is traversed by the cool water flowing to the ammonia condenser 48. This hot concentrated brine is thus partly cooled by the fresh water flowing through valve 45 and meter 46 and the thereby somewhat cooled concentrated brine is then passed through pipe 87 and flow meter 88 into the interior pipe 41 of the already herein-above described heat exchanger 42, leaving the latter through line 90 which directs it through valve 91 into pipe 23 where it joins the flow of the cooled concentrated brine flowing from the sump 22. By means of heat exchange effected by the instrumentalities just recited there is but little loss of heat, and the residual refrigerative effect of the partially diluted sorbent or brine is fully utilized and transferred to the water which serves to cool the compressed ammonia gas so as to condense it back into liquid ammonia in the ammonia condenser 48.

When the sorbent or brine is concentrated in concentrator 67 there will of course be developed a certain amount of steam, which leaves the top of the concentrator 67 through the pipe 92 passing through the pipe 93 and a spray trap 94 and thence through the line 95 into the jacket of the heat exchanger or hot water heater 12 serving to heat the water therein. Hot condensate leaves the heat exchanger or water-heater 12 through the line 96 and passes through the jacket 97 of heat exchanger 56 and eventually leaves the system through discharge pipe 98. Its residual heat is thus transferred to the partially spent sorbent or brine which has already absorbed some of the heat from the water supply in heat exchanger 45. There again efficient heat exchange and saving of heat units is effected.

If the steam demand for heating the platens is in excess of that supplied by the necessary regeneration of the brine, a connection 103 with the city water supply 137 controlled by the valve 104 permits make-up to the desired amount.

Additional thermometers and gauges are shown at various points, but as their function is self-evident it is not deemed necessary to describe each one of them in detail. Moreover, there is also provided an expansion tank 105 which is connected through line 11 to the already mentioned hot water heater 12. In line 95 (see lower left-hand corner of Fig. 1) there is a valve 106 which is normally open so that steam may flow to the hot water heater 12. It is, however, under the control of a thermostatic control 107 which serves to throttle the flow of steam in case the out-going water from the water heater, and which flows through line 15 to the pumps 16, gets too hot. Thermometer 108 serves to indicate the temperature of this water and is connected to the line 14. In other words, if the water gets too hot, steam valve 106 is throttled down or even entirely closed off.

In greater detail, the apparatus consists of the following various elements.

Referring particularly to Figs. 2 and 3, these show in elevation and partially in section, an apparatus which comprises the housing 1, within which the vacuum drying space exists. Within the housing 1 there is positioned the frame work 108' which serves to support suitable rollers 3 and 4, which support the drying belt 2 which travels in close contact with the upwardly arched bridge platen 5, this platen consisting of three separate sections which are supported upon suitable beams 109. It is conveniently termed a "bridge" as it is upwardly arched and the belt travels across it.

It will be noticed that each of the sections is subdivided into a number of individual parts by the partitions 8, which extend only partially across, as can best be seen from the diagrammatic illustration in Fig. 1, and also in Figs. 15, 16 and 17, thus providing a circuitous path for the heating liquid.

The belt 2, which moves to the left as shown by the arrows in boths Figs. 2 and 3, finally passes over the roller 4 (left side of Fig. 2), and returns to roller 3, means being provided in the form of the roller 110 which is supported on lever 111 which in turn is pinioned on the bearing 112, there being tensioning means attached to the frame work and bearing the broad reference numeral 113. This is a more or less common type of tensioning device to insure the tightness of the belt and an adjustment may be made by means of the screw 114. A suitable motor 115 (Fig. 2) shown as being contained within the housing 1, serves by means of chain-belt 116 and pulley 117 to impart movement to the roller 4, which serves to pull the belt in the direction shown.

At a short distance above the belt 2 and as shown in the upper right-hand corner of Fig. 3 there is shown the pipe 118 which feeds spray nozzles 119, which serve to distribute the material that is to be dehydrated upon the belt 2. The material is applied in liquid form through the pipe 118 under sufficient pressure so that, upon leaving the orifices of the spray-heads 119, it will break into a very fine mist, which has sufficient momentum to bring it into contact with the belt 2. The force with which the material is applied is such that despite the fact that evaporation from the droplets takes place almost instantaneously by reason of the low pressure (high vacuum) existing in the apparatus, the material will still be liquid at the time that it contacts with the belt 2, as a result of which the small individual spherical droplets of material will tend to flatten themselves against the belt 2. This particular feature is illustrated in greater detail in connection with Fig. 10. By reason of the rapid vaporization of the water from the material, it will soon attain a temperature well below the freezing point of water, i. e. below 0° C. (32° F.) so that after the belt has progressed but a short distance to the left, the material will be found to have frozen thereon in a thin but fairly uniform film. As already mentioned, a heating medium such as warm water is passed through the various sections of the arched bridge platen 5, and the various sections thereof may be heated to different temperatures, if desired; for instance the central section may be heated to a higher temperature than either of the sides, or under some circumstances, where the product is not too heat-sensitive, the last plate, that is the one furthest to the left in Fig. 2, may be at a higher temperature than the other two sections.

The progress of the material through the machine can be observed through the numerous windows 120 which are provided along both sides of the chamber 1.

As the material becomes dehydrated in accordance with the general description already given, and arrives at the point of the belt which is on roller 4 (left upper side of Fig. 2), the material will tend to fall off the belt 2 as it makes a turn around roller 4, but to insure the complete removal of the material there is provided the resiliently mounted doctor-blade 121 which causes the dried material to fall in the form of a flaky powder into the hopper 122 located immediately below the roller 4, and the doctor-blade 121. The mechanism for operating this doctor-blade is separately illustrated and described in connection with Figs. 11 and 12. The material eventually falls on to a transversely thereof operating conveyor belt 123, which serves to convey the material into a set of hoppers on each side of the chamber, these hoppers serving to conduct the material through tubes 145 into packing devices broadly designated by the numeral 125, the construction of which is described in detail in connection with Figs. 13 and 14.

These receiving or packing devices 125 are intended to be operated alternately, and for that reason the belt 123 is alternately moved either in a direction away from or toward the beholder (as viewed in Fig. 2), movement being imparted to the belt by means of the motor 126 which, by means of the chain belt 127, drives the shaft 128. The operation of motor 126 is under the control of the operator from a point outside of chamber 1.

The upwardly arched plates of the bridge platen 5 are generally supported within the apparatus by means of longitudinal beams 129 and cross-beams 109.

The condensing means for the water vapor which evolves from the material which is traversing the chamber on belt 2 consists of the following:

The heavily insulated tank generally designated by the reference numeral 130 consists of two metallic walls between which there is an insulating packing 131. Into this general receiving vessel or tank 130 there is sprayed through spray nozzles 21, fed by pipe 27, a refrigerated sorbent or cooling medium, for example lithium chloride brine, which may for example consist of a 10 molal solution of lithium chloride. As will be seen from Figs. 2 and 3, these spray nozzles 21 and pipe 27 are located below the belt 2 and its supporting structure. In order to avoid any of the spray from getting on to the belt and thereby possibly contaminating the product, there are provided the horizontally disposed series of louvers 132, through which the water vapor evolved from the material undergoing drying may freely pass, so as to become absorbed in the spray or sorbent, or condensed directly to ice thereby. The sorbent material collects in the bottom of the tank 130, and finally leaves through the sump 22 which is at about the center of the chamber 1 and is shown in the extreme lower right of Fig. 2.

Pipe 23 and valve 25 control the flow of brine or other sorbent from chamber 1. By reason of the high vacuum existing therein, pump 24 (which was shown in Fig. 1) is used to effect the flow of the sprayed and re-collected brine.

The means for attaining the desired vacuum consists of a vacuum pump 133 which is connected with the chamber 1 by means of the pipe 134 which is somewhat broadened into the form of a funnel 135 within the portion 201 of the chamber 1 which closely adjoins the aforementioned collecting hopper 122.

In order to prevent any of the brine or sorbent spray from being drawn into the vacuum pump, there are provided the vertical and slanting louvers 99, and the entrainment-eliminators 136.

The louvers 99 and their supporting plate 202, and the louvers 136 serve to form chambers 201 and 203 which are bounded at the top by the imperforate plate 200, so that all of the gases and vapors evolved from the material that is being dried on the belt 2 must traverse the spray of cooling and condensing agent or sorbent sprayed from nozzles 21, whereby any condensible water or other vapor will be condensed and/or absorbed by said cooling agent or sorbent. The residual gases hence must find their way through both sets of baffles 99 and 136 before being drawn into the vacuum pump. This not only protects the pump, but also renders the operation more efficient. The pump 133 may be, for example, a standard high efficiency vacuum pump which, when the chamber is tightly closed and properly sealed, is capable of evacuating this chamber to a residual pressure of not exceeding about 4000 microns (4 millimeters Hg column).

The chamber is rendered accessible to entry, when not in use, by means of the suspended door 140 (see Figs. 5, 6 and 7), and the entire chamber 1 is supported upon pillars 141 on the floor 142. Fig. 6 shows the pumps 16, the flow-meters 7, pipes 6, 9 and 18, and the various gauges and thermometers 19 and 20, already described in connection with Fig. 1. The pumps are mounted on suitable concrete foundations 143, and the door 140 is supported by the support 144 so that, if necessary, it can be entirely swung aside to permit portions of the interior fittings of the apparatus to be moved in and out, or to be adjusted if desired.

By means of the flow-meters 7, and the various thermometers, gauges and control mechanism, which, advantageously all can be concentrated on a single control panel in full view of the operator, the operation of the apparatus, and the accurate control of the process, can be carried out. By reason of the excellent correlation of heat-input and heat-consumption, the operation of the process is practically as inexpensive as the more or less common type of vacuum drying systems hitherto employed, with the added advantage that the products obtained are readily reconstituted to the original condition by the mere addition of the appropriate amounts of water, corresponding to that present in the original product.

After the apparatus has been described in more minute detail, examples of the actual dehydration of a number of products will be given.

As already briefly indicated, means are provided for removing dried material from the chamber 1 without interfering with the continuous carrying out of the operations therein conducted, and without effectively varying the high vacuum conditions therein existing. Thus material that is being scraped from the main drying-belt 2 by means of the adjustable doctor-blade 121 (whose precise construction will be taken up hereinbelow), falls through the funnel 122 onto the transverse carrying belt 123, which may be of metal, rubber, canvas, etc., and which can alternately be moved in opposite directions. The belt 123 is carried on two pulleys 166 and these are operated by means of the motor 126 and chain belt drive 127. The pulleys 166 about which the belt makes its return bend are located above hoppers 124, there being two of these, one on each side of the apparatus. These hoppers 124 direct the stream of dried material into the conveying tube 145, which carries the material under the influence of gravity into the jar-filling devices broadly designated as 125.

In detail (see Figs. 13 and 14), these filling devices each consist of a chamber 146 which is suitably supported from the chamber 1 by means of I- or T-beams 147 and is in direct communication with the chamber 1 through the passageway 148 through which the tube 145 also passes. The passageway and tube are, moreover, capable of being effectively shut off from communication with the main chamber 1 by means of the sliding closure 149 which is capable of reciprocal movement, being actuated by means of the rack 150 and pinion 151, the latter being mounted upon shaft 152, the latter being provided with a hand-wheel 153. When the shaft 152 is rotated in a clockwise direction (Fig. 14), the closure 149 will be drawn to the right, so that any material flowing through the chute 145 may flow into a bottle or jar 154 which is supported in a glass housing 155 within a supporting member 156, which latter may be given an upward or downward movement through the intermediation of the screw 157 which is operated by means of the rod 158 which is provided with the hand-wheel 159. The glass housing 155 is secured to the chamber 146 by means of four vertically extending rods 160 which support the cylindrical glass housing 155 by means of the platform 161 through which the screws 157 and shaft 158 pass, the rods being passed through ears 162 and secured by wing-nuts 163. Suitable gaskets 164 and 164' serve to provide air-tight seals between the glass housing 155 and the platform 161. To provide for larger containers than the jars 154, a larger housing and therewith associated rods of the same type as rods 160 may be provided, as indicated in dotted lines in Fig. 13. The principle of operation, however, is the same.

In case it is desired to seal the dried material either in vacuo or in an inert gas, the following conveniences are provided. An electromagnetic holder 170 provided with a solenoid 171 and lead-wires 172 (which are connected to a source of direct current, such as a battery, not shown) is attached to the closure-member 149 so as to be movable therewith. A suitable cap (not shown) may be magnetically held to the closure-member when the latter is in the position shown in Fig. 14. Then, when the jar is in place and a suitably high vacuum has been produced in the space 146 by exhausting the air therefrom, as for example by means of the pipe 175, the closure member may be moved to the right by means of the rack 150 and pinion 151, thereby carrying the cap along with it. When sufficient dried material has been dropped into the jar 154, the closure member is brought back into place, whereafter a suitable inert gas, such as carbon dioxide or nitrogen, is led into the space 146, either through the pipe 175 or another pipe, so as to break the vacuum therein, until atmospheric pressure has been established in the space and in the jar 154, which is thus filled with the inert gas. The current may then be cut off from the solenoid 171, whereby the cap will drop into place. Or, the cap may be dropped first, so that when the gas is admitted into the space 146 the cap will be firmly pressed against the periphery of the jar by the outer pressure; while a vacuum will be maintained within the jar. In the latter case, the vacuum could be broken with ordinary air. However, an inert gas is preferred. When putting a new jar in place, the space 146 must be evacuated to the same degree of vacuum so that when the closure member 149 is retracted, the pressure condition within the chamber 1 may not be substantially altered, as this might interfere with the proper operation of the drying process being performed therein.

In order to insure a tight sealing off of the chamber 1 from the space 146, gaskets 263 and 264 are provided. The manner of attachment of the housing 174, which provides the space 146, to the main body 1 of the apparatus will be self-evident from the construction shown in Figs. 13 and 14. The housing 174 is provided with a suitable plate 176 which is suitably bolted to the end of said housing by means of the bolts 176'. In order to provide for smooth operation of the closure member 149, it is provided with a sliding-frame 177 which rides on rollers 178.

The closure member 149 is constructed of two main parts. The upper part 220 may be moved vertically so as to make tight contact with the gasket 263. This is accomplished by providing the two rollers 221 which pinion on said upper part. The lower part 222, which is separate from the upper part 220, has an inclined surface upon which said rollers 221 may roll. With the device shown in the position illustrated in Fig 14, the lower part has traveled to the extreme left and has in consequence thereof raised the upper part of the device against the gasket 263. The spring 179 tends slightly to push the device to the right. When the gear wheel 151 is turned clockwise, the first effect will be to draw the portion 222 to the right, as a result of which the part 220 will drop away from the gasket 263. Shortly thereafter, the entire device 149 will also move to the right so that eventually there will be no obstruction between the chute 145 and the jar 154, so that material can freely flow into it. On reversing the operation, the closure 149 will first ride to the left until it is in alignment with the opening of chute 145, whereafter as a result of the further leftward movement, of the portion 222 the upper part will rise upwardly until it is pressed into engagement with the gasket 263. When, thereafter, air or gas is admitted into space 146, the pressure of the part 220 against the gasket 263 will ensure a tight seal.

The entire assembly 125 (see Figs. 9, 13 and 14) thus serves as a means for removing material from the apparatus during its operation without disturbing the vacuum and other conditions therein; and the entire assembly forms a single element of some of the subjoined claims.

Fig. 10 is a diagrammatic representation, on an enlarged scale, of the action of the spray nozzles and what happens when they deposit the material which is to be dehydrated upon the belt 2. It will be noticed that the particles issuing from the nozzle, and which approach the belt, are shown as composed of substantially spherical droplets which, however, become flattened out as they hit the belt. An attempt has been made to indicate their frozen condition by shading the flattened droplets at the point immediately below the arrow which indicates the direction of movement of the belt to the left. By reason of the fact that the particles or globules while in transit toward the belt present a minimum of surface, the area from which vaporization can take place is definitely restricted so that even though evaporation of liquid or water from the droplets begins instantaneously when they get into the low pressure surroundings, there would be insufficient vaporization to cause them to become ice particles, which, if it did occur, would cause them to bounce away from the belt 2 instead of being deposited thereon.

An important feature of the present invention resides in coordinating, for a given product, the pressure on the product as it enters the spray nozzles in conjunction with the size of the nozzle orifice so that the size of the droplets produced and their velocity may be controlled, whereby freezing of the particles is delayed until they strike the belt. When they hit the belt, the particles are flattened against the same, thereby blending to form a more or less continuous film. The increase in the surface area of the particles after they are flattened against the belt permits liberation of water vapor from within the droplets, the internal pressure being sufficient to overcome the surface tension, and rapid freezing then occurs. The quantity of material sprayed into the chamber and the speed of the belt determine the thickness of the film deposited on the belt.

The details relative to the operation of the doctor-blade 121 which serves to remove the dried material from the belt 2, are illustrated in Figs. 11 and 12, which are on a somewhat larger scale than either Figs. 1 or 2.

By reason of the fact that the material which is dried on the belt 2, and which it is desired to remove shortly after the belt makes its turn around the pulley 4, is a very thin layer, and as it is undesirable to build up a thick layer, and moreover as the belt should be reasonably clear at the time the material is freshly sprayed thereonto, efficient means are provided for removing substantially all of the material from the belt. For this reason the doctor-blade 121 is provided, which bears against the belt 2 at a point where the belt is in contact with the roller 4.

The doctor-blade itself consists of the main body 121 and the actual knife 180. The knife itself is bolted to the angle iron 181 which is provided on the shaft 182. Keyed to the said shaft is the lever 183 whose smaller end 184 is pivoted on the pivot 185, which latter is connected by means of the rod 186 to the connecting member 187, the other end of which is connected to the toggle 188 which pivots about the pin 189.

Intimately fastened to the toggle 188 is the handle 190. By reason of the link construction 191 provided with the slot 192 and by lifting the lever 190 upwardly and swinging it to the left, the connecting member 187 and the thereto connected rod 186 will be moved downwardly and to the right so as to impart to shaft 182 a counterclockwise movement which therefore will move the angle iron 181 to which the doctor-blade 121 is attached in such a manner as to disengage the blade 180 of the doctor-blade 121 from contact with the belt. Moreover, a suitable spring (not shown in the drawing) and which is contained within the housing 187 of the connecting member and under the control of the threaded annular member 193, is capable of accurately adjusting the pressure of the contact of the blade 180 against the belt 2. The shaft 182 moreover is journalled in plates 194, which plates are held to the side walls of the frame by means of the bolts 195 which operate in slots 196 and 197, whereby the exact position of the doctor-blade relative to the belt 2 and the pulley 4 can be adjusted. It is thus possible when necessary to alter the angle of attack of the doctor-blade against the belt.

Whenever it is necessary to obtain access to the interior of the chamber 1, the already mentioned door 140 is provided, this being suspended from the crane 144 (see Fig. 7) which is capable of holding the weight of the door when the same is swung to one side. The door is fastened to the end of the chamber 1 by means of a plurality of clamps 210 and which, after the door has been swung into the opening, are secured to the chamber by means of bolts 212, said clamps bearing with their one end against the upstanding flanges 211 and with the other against the flanges 218 (which construction can best be seen at the extreme right side of Fig. 5). A suitable gasket 213 is also provided so that the door will make an airtight seal with the chamber 1. Self-evidently as soon as the pressure in the chamber drops as a result of pumping the air therefrom, the external air pressure bearing against the door 140 will force the same ever tighter against the gasket 213 so that leakage will be practically prevented. It is, however, advisable to tighten up the nuts 213a on bolts 212 after the vacuum is established. If at any time the apparatus requires entry, the nuts 213a should preferably be somewhat loosened before air is admitted into the apparatus, as otherwise they would bind so tightly as to be difficult to open.

In order to permit accurate adjustment of the door 140 into its opening, there is also a hanging-bolt 214 which is attached to the door by connection 215. The bolt carries a spring 215a strong enough to support the load of the door but still permitting a limited amount of movement thereof in an upward and downward direction.

In Figs. 15, 16 and 17 are shown some of the details of the platen 5 which, as already mentioned, is provided with the internal baffles 8 which cause the liquid in the platens to take a circuitous path. The point of entry and exit of the liquid is shown respectively at the threaded openings 216 into which pipe 6 leads, and the exit pipe 9, which are threaded into the outlet 219.

Fig. 18 is purely illustrative of the general shape of the platen, which, as already has been mentioned, is upwardly convex for the purpose of insuring good heat-conducting contact with the belt 2.

The operation of the apparatus will, it is believed, be evident from the description, particularly in connection with what has been said regarding Fig. 1. It is difficult to give precise instructions as to the various temperatures, operational speed, etc., which may be employed, as this of course depends a great deal upon the material which is being sprayed into the apparatus.

As an example of the actual operation of the apparatus and to give some indications of its size, the following data are given:

The belt 2 is 24" wide, but its effective width is only 21½", as the spray nozzles 119 produce a width of sprayed material only 21½" wide. In the drying of ordinary whole milk, the speed of the belt was 10 feet per minute, and inasmuch as in the machine in question the arched bridge platen 5 was 12 feet long, the period of contact between the belt 2 and the platen 5 was, at the given belt speed, 1.2 minutes. The nozzles 119 were spaced a distance of 6 inches from the belt and only 2 nozzles were used at the time, being 5 inches apart, thus producing a considerable overlap. The nozzles actually used were known as of the hollow cone type furnished by the Spraying Systems Company, Chicago, Size No. 2.

The actual vacuum maintained in the chamber 1 was 500 microns and the platen temperature was maintained uniformly at 200° F. The sorbent used was lithium chloride brine of about 10 molal concentration, which in the case of milk is high enough, and this brine had been refrigerated to such a temperature that at the time it was sprayed into the apparatus to absorb the moisture given off by the drying milk it had a temperature of −5° F. The temperature of the milk sprayed into the apparatus was 60° F.

In producing dried coffee extract, a well roasted coffee was brewed with such quantities of water that the liquid coffee treated had a concentration of from about 4 to 7%. The rate of feed in the case of the concentrated coffee as well as in the case of milk was 1.6 gallons per hour for each nozzle or a total of 3.2 gallons per hour. The pressure on the liquid entering the nozzle was 10 pounds, the pressure drop across the orifice being of the order of 25 pounds due to the vacuum in the chamber.

The moisture content of the dried milk or dried coffee, whichever is being dried, was found to be about the same, namely about 1% residual moisture.

It will of course be evident that many modifications may be made within the skill of the engineer in the precise construction of the instrumentalities herein described, and moreover that the type of vacuum equipment used may be suitably varied as of course much of this is standard commercial construction.

All of the essential features of the apparatus, such as has been actually constructed and operated, have been fully described so that its reproduction on the basis of this description will be possible on the part of any properly skilled engineer.

The detailed description of the apparatus and of the process is more for the purpose of teaching the art of the invention which is claimed herein, rather than to serve as a set of drawings or blueprints, and therefore applicant does not desire to be limited to the precise details shown, but wishes his claims to be interpreted in the broadest aspects commensurate with the prior art. Thus the strength of the brine used to absorb the water may be from about 6 molal upwards, if lithium chloride is employed.

The essential feature in the present invention resides in the construction of the apparatus and the orientation of its various parts in such a manner as to make possible for the first time large scale continuous commerical drying, from the frozen state, of aqueous products in a continuous manner, as contrasted with the small scale individual batch operations of the prior art, and of course also in the method of effecting such drying.

The present application is a continuation-in-part of applicant's earlier filed application Serial No. 515,844, filed December 27, 1943, now abandoned.

Accordingly applicant claims:

1. A continuous process of dehydrating a flowable aqueous material which comprises applying it in the form of a thin adherent layer to a moving heat-conducting conveying means positioned in an evacuated completely closed vessel maintained at a total gas pressure of not over about 4000 microns, thus substantially instantly freezing the applied material upon said conveying means by loss of heat occasioned by the rapid vaporization therefrom of some of its constituent water, supplying heat to said conveying means and the material frozen thereonto to effect the evaporation of the residual but now frozen water therein, whereby the material on the conveying means is dehydrated, within the same evacuated vessel and in close proximity to said conveying means condensing the liberated water vapor by means of a refrigerated liquid having, at the temperature at which it used, a vapor tension so low as not to yield vapor to said evacuated vessel, removing the dried material from said vessel without substantially changing the pressure therein, withdrawing the refrigerated condensing liquid from said vessel and removing water therefrom outside of said vessel, re-refrigerating the refrigerating liquid, and re-introducing it into said vessel to condense water vapor evolved from further quantities of material being dehydrated.

2. A continuous process of dehydrating a liquid comestible which comprises applying it to a moving heat conducting belt in an evacuated completely closed vessel maintained at a total gas pressure of not over about 4000 microns, thus substantially instantaneously freezing the comestible upon said belt by loss of heat occasioned by the rapid vaporization therefrom of some of its constituent water, supplying heat to said belt and the material frozen thereonto by direct heat transfer from metallic heat conducting means in sufficient contact with the obverse side of said belt to effect the evaporation of the residual but now frozen water in the comestible, whereby the comestible on the belt is dehydrated, within the same evacuated vessel and in close proximity to said belt absorbing the liberated water vapor in a spray of a refrigerated concentrated solution of a brine having, at a temperature at which it is being sprayed, a vapor tension so low as not to yield vapor to said evacuated vessel, removing the dried comestible from said vessel without changing the pressure therein, withdrawing the brine from said vessel and removing sufficient absorbed water therefrom outside of said vessel to maintain the requisite concentration of the brine, re-refrigerating the thus reconcentrated brine and re-spraying it into said vessel to absorb water vapor evolved from further quantities of comestibles being dehydrated.

3. A continuous process of dehydrating a water-miscible comestible which comprises adjusting its water content to not substantially less than about 50% and spraying the resulting mixture directly upon a moving heat-conducting metallic belt in an evacuated completely closed vessel maintained at a total gas pressure of not over about 4000 microns with sufficient force to cause the individual droplets thus produced to contact with the upper surface of said belt in a time period sufficiently rapid to prevent the solidification of the droplets as a result of the auto-refrigeration of the water therein contained, thus substantially instantly freezing the sprayed material upon the upper surface of said metallic belt by loss of heat occasioned by the rapid vaporization therefrom of further quantities of its constituent water, supplying heat to the obverse side of said belt and therefore also to the material frozen thereon by means effecting close contact between the heating means and said belt, so as to effect the evaporation of the residual frozen water in said comestible, whereby the material on the conveying means is dehydrated, within the same evacuated vessel and in close proximity to said belt absorbing the liberated water vapor in a spray of a concentrated refrigerated solution of lithium chloride, removing the dried material from said belt and said vessel without raising the pressure in said vessel above 4000 microns, withdrawing the now partially diluted lithium chloride solution from siad vessel, and removing absorbed water from said solution outside of said vessel by sufficiently heating the solution to convert the absorbed water thereof into steam thereby again yielding a concentrated solution of lithium chloride, re-refrigerating the lithium chloride solution, and re-spraying it into said vessel to absorb water vapor from further quantities of material being dehydrated.

4. A continuous process of dehydrating a flowable aqueous material which comprises applying it in a thin layer to a moving heat-conducting conveying means in an evacuated space maintained at a total gas pressure of not over about 4000 microns, thus substantially instantly freezing the applied material upon said conveying means by loss of heat occasioned by the rapid vaporization thereof of some of its constituent water, supplying heat to said conveying means and the material frozen thereon to effect the evaporation of the residual but now frozen water therein, whereby the material on the conveying means is dehydrated; within the same evacuated space and in close proximity to said belt absorbing the liberated water vapor by means of direct contact with a refrigerated concentrated brine having, at the temperature at which it is used, a vapor tension so low as not to yield water vapor to said evacuated space, removing the dried material from said space without substantially changing the pressure therein, withdrawing refrigerated brine from said space and removing water therefrom outside of said space by heating the same to a temperature sufficiently high to liberate steam therefrom, thereby re-concentrating said brine, re-refrigerating said concentrated brine, and reintroducing it into said evacuated space to absorb water vapor evolved from further qualities of material being dehydrated, and utilizing said steam at least in part to supply heat to said conveying means.

5. The process of claim 4 in which the brine is a solution of an alkali halide.

6. The process of claim 4 in which the brine is a solution of a lithium halide.

7. The process of claim 4 in which the brine is an at least 6-molal solution of lithium chloride.

8. An apparatus for the low temperature dehydration of flowable aqueous material which comprises a chamber, means for lowering the gas pressure therein to not above about 4000 microns; a movable heat-conducting conveyor positioned within said chamber, and means for imparting movement thereto; means within said chamber for applying material to be dehydrated to said conveying means; means within said chamber of heating said conveying means; means within said chamber for distributing a refrigerated liquid condensing agent therein out of contact with said conveying means; means for removing said condensing agent from said chamber; means for removing dried material from said conveyor and out of said chamber without affecting the pressure conditions therein; means outside of said chamber for removing water from said condensing agent; means for refrigerating the thus treated agent; means for returning said refrigerated condensing agent to said distributing means; means for condensing the steam given off during the water removal from said condensing agent; and means therewith associated for heating a heating medium with said steam; and means for circulating the heated heating medium through the heating means located in said chamber.

9. An apparatus for the low temperature dehydration of flowable aqueous material which comprises a chamber, means for lowering the gas pressure therein to not above about 4000 microns; a movable heat-conducting conveyor positioned within said chamber, and means for imparting movement thereto; means within said chamber for spraying material to be dehydrated upon said conveying means; means within said chamber for heating said conveying means comprising an upwardly arched convex internally-heated bridge platen in close heat-conductive contact with said conveying means; means within said chamber for distributively spraying refrigerated sorbent thereinto out of contact with said conveying means; means for removing sprayed sorbent from said chamber; means for removing dried material from said conveyor and out of said chamber without affecting the pressure conditions therein; means outside of said chamber for evaporating water from said sorbent; means for refrigerating the thus reconcentrated sorbent; means for returning said refrigerated sorbent to said spraying means; means for condensing the steam given off during the evaporative concentration of said sorbent; and means therewith associated for heating a heating medium with said steam; and means for circulating the heating medium through the bridge platen located in said chamber.

10. An apparatus for the low temperature dehydration of flowable aqueous material which comprises a chamber, means for lowering the gas pressure therein to not above about 4000 microns; a movable heat-conducting conveyor positioned within said chamber, and means for imparting movement thereto; means within said chamber for spraying material to be dehydrated upon said conveying means; means within said chamber for heating said conveying means comprising an upwardly arched convex internally-heated bridge platen in close heat-conductive contact with said conveying means; means within said chamber for distributively spraying refrigerated sorbent thereinto out of contact with said conveying means; means for removing sprayed sorbent from said chamber; means for removing dried material from said conveyor and out of said chamber without affecting the pressure conditions therein, comprising means for scraping dried material from said conveyor, and a movable belt upon which material thus scraped is received and transported; means outside of said chamber for evaporating water from said sorbent; means for refrigerating the thus reconcentrated sorbent; means for returning said refrigerated sorbent to said spraying means; means for condensing the steam given off during the evaporative concentration of said sorbent; and means therewith associated for heating a heating medium with said steam; and means for circulating the heating medium through the bridge platen located in said chamber.

11. An apparatus for the low temperature dehydration of flowable comestibles which comprises a chamber, means for lowering the gas pressure therein to not over about 4000 microns; a movable metallic belt positioned within said chamber; means for moving said belt; means for spraying liquid material upon the upper surface of said belt, means within said chamber, and consisting of an arched internally-heated bridge platen for heating said belt by sliding contact thereof with the convex side of said platen; means within said chamber for distributively spraying refrigerated brine thereinto out of contact with said belt; means for removing sprayed sorbent from said chamber; means for removing dried material from said belt and out of said chamber without affecting the pressure conditions therein; means outside of said chamber for evaporating water from said sorbent; means for refrigerating the thus reconcentrated sorbent; means for returning said refrigerated sorbent to said spraying means; means for condensing the steam given off during the evaporative concentration of said sorbent; and means therewith associated for heating a heating medium with said steam; and means for circulating the heating medium through the bridge platen located in said chamber.

12. A continuous process of dehydrating a flowable aqueous material which comprises forming a film thereof on moving conveying means in an evacuated completely closed vessel maintained at a total gas pressure of not over about 4000 microns, thus substantially instantaneously freezing the film on said conveying means by loss of heat occasioned by the rapid vaporization therefrom of some of its constituent water, supplying heat energy to said film to effect the evaporation of the residual water therein, whereby the material in the film will be dehydrated; condensing and absorbing the resulting water vapor within the same evacuated vessel in close proximity to the film-carrying conveying means by means of a refrigerated liquid having, at the temperature at which it is used, a vapor tension so low as not to yield vapor to said evacuated vessel, breaking up the film of dehydrated material and removing the resulting subdivided material from the evacuated vessel without substantially changing the pressure conditions therein.

HORACE L. SMITH, Jr.

REFERENCES CITED

The following references are of record in the file of this patent:

UNITED STATES PATENTS

| Number | Name | Date |
|---|---|---|
| Re. 17,854 | Kratz | Nov. 4, 1930 |
| 888,257 | Passburg | May 19, 1908 |
| 1,076,923 | Tellier | Oct. 28, 1913 |
| 1,286,538 | Coleman | Dec. 3, 1918 |
| 1,580,658 | Field | Apr. 13, 1926 |
| 1,756,992 | Quiggle | May 6, 1930 |
| 1,933,819 | Miles et al. | Nov. 7, 1933 |
| 1,970,956 | Elser | Aug. 21, 1934 |
| 2,100,151 | Tietz | Nov. 23, 1937 |
| 2,129,299 | Bichowsky | Sept. 6, 1938 |
| 2,132,897 | Gentele | Oct. 11, 1938 |
| 2,345,548 | Flosdorf et al. | Mar. 28, 1944 |
| 2,396,561 | Flosdorf | Mar. 12, 1946 |
| 2,399,246 | Patrick, Jr., et al. | Apr. 30, 1946 |
| 2,400,748 | Flosdorf | May 21, 1946 |
| 2,402,401 | Hickman | June 18, 1946 |
| 2,411,152 | Folsom | Nov. 19, 1946 |
| 2,414,940 | Flosdorf | Jan. 28, 1947 |